United States Patent Office 2,794,814
Patented June 4, 1957

2,794,814

4,16-PREGNADIENE-3,11,20-TRIONE AND PROCESS

Douglas A. Lyttle and Robert H. Levin, Kalamazoo Township, Kalamazoo County, Mich., assignors to The Upjohn Company, Kalamazoo, Mich., a corporation of Michigan No Drawing. Application August 27, 1953,
Serial No. 376,990

6 Claims. (Cl. 260—397.3)

The present invention relates to a novel steroid compound and is more particularly concerned with novel 4,16-pregnadiene-3,11,20-trione and with a process for the production thereof.

The novel compound of the present invention is illustratively represented by the following formula:

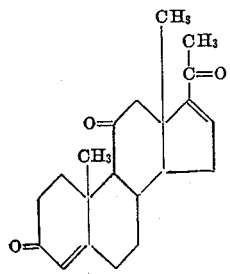

The novel compound of this invention is prepared by forming a 3-hydrazone of an 11α-acyloxy-17α-halo-4-pregnene-3,20-dione by treating 11α-acyloxy-4,17α-dihalopregnane-3,20-dione in the presence of an acid with an organic hydrazine capable of forming a hydrazone, hydrolyzing the 3-hydrazone, dehydrohalogenating the resulting 11α-acyloxy-17α-halo-4-pregnene-3,20-dione to form the desired 11α-acyloxy-4,16-pregnadiene-3,20-dione, hydrolyzing this ester, and oxidizing the obtained 11α-hydroxy-4,16-pregnadiene-3,20-dione to the desired 4,16-pregnadiene-3,11,20-trione. In this process any organic hydrazine containing two hydrogen atoms on one of the hydrazino nitrogen atoms can be used. The hydrolysis of the 3-hydrazone group is advantageously effected by an exchange reaction with a ketaldone. The word "ketaldone" refers generically to aldehydes and ketones. For this purpose a ketaldone in which the oxo group is attached to an electrophilic group, as in pyruvic acid, pyruvic aldehyde, and benzaldehydes, such as meta-, para-, and ortho-hydroxybenzaldehydes, and meta-, para-, and ortho-carboxybenzaldehydes, is advantageous. The dehydrohalogenation advantageously is effected with an amine, such as pyridine, and the hydrolysis is advantageously effected by means of a strong base, such as sodium or potassium hydroxide. The oxidation of the 11α-hydroxy-4,16-pregnadiene-3,20-dione is advantageously effected with chromic anhydride in pyridine.

It is an object of the present invention to provide novel 4,16-pregnadiene-3,11,20-trione. Another object of the invention is to provide a process for the production of 4,16-pregnadiene-3,11,20-trione. Other objects of this invention will be apparent to one skilled in the art to which this invention pertains.

The novel compound, 4,16-pregnadiene-3,11,20-trione of the present invention is a stable, easily crystallizable solid which has not only valuable pharmacological and physiological activity, but is also an important intermediate in the production of active 11-oxygenated keto steroids. For example, 4,16-pregnadiene-3,11,20-trione treated with perbenzoic acid yields 11-keto-16(17)-oxidoprogesterone. The epoxide is then opened with hydrogen bromide and the resulting 16-bromo-17α-hydroxy derivative is treated with zinc dust to remove the bromine and yield 17α-hydroxy-11-ketoprogesterone (21-desoxy "E") which on treatment with lead tetraacetate, followed by saponification give cortisone (17α,21-dihydroxy-4-pregnene-3,11,20-trione), and on treatment with lithium aluminum hydride, with protection of the 3- and 20-keto groups, gives 11β,17α-dihydroxy-4-pregnene-3,20-dione (21-desoxy "F"), a new compound possessing pronounced inhibiting effect on the secretion of the adrenocorticotropic hormone (ACTH) and having value, therefore, in the treatment of diseases where oversecretion of ACTH and adrenal hormones occurs, for example, in adrenal hyperplasia and pituitary basophilism (Cushing's disease).

The starting compounds of the present invention are the 4,17α-dihalo-11α-acyloxypregnane-3,20-diones. The acyl group can be carboxacyl, sulfonacyl, phosphonacyl and the like and can have substituents such as halo, mercapto, methoxy, ethoxy, hydroxy, carboxy, carbalkoxy, and like groups. Advantageously the acyl group is the carboxacyl group of a carboxylic acid. The halo group advantageously is bromine or chlorine. The starting compounds are prepared by treatment of 11α-hydroxypregnane-3,20-dione or 11α-acyloxypregnane-3,20-diones with an acid anhydride to form the corresponding enol esters, 3,11-α,20-triacyloxy-4,17(20)-pregnadienes, which by treatment with a hypohalous acid furnish the 4,17α-dihalo-11α-acyloxypregnane-3,20-dione as shown in Preparations 1 to 4, inclusive.

In carrying out the process of the present invention the selected 4,17α-dihalo-11α-acyloxypregnane-3,20-dione is dissolved in an organic solvent, such as dioxane, acetic acid, acetone, dimethylformamide, tertiary butyl alcohol, and ethanol, or mixtures of these solvents, with dioxane and acetic acid preferred, containing from five to 25 percent water, and to this solution is added, usually with continuous stirring, a solution of an organic hydrazine such as semicarbazide, phenylhydrazine, 2,4-dinitrophenylhydrazine, para-nitrophenylhydrazine, α- or β-naphthylsemicarbazide, 2,4- and 3,5-dinitrophenylsemicarbazide, and other substituted hydrazines with semicarbazide preferred. The preferred temperature at which the reaction is carried out is between about fifteen and about forty degrees centigrade, however, temperatures between about zero degrees and about 100 degrees centigrade are operative. The time of reaction varies from about half an hour to twelve hours or even longer and during this period a color change from colorless to yellow or orange and back to colorless or pale yellow is noted.

The 11α-acyloxy-17α-halo-4-pregnene-3,20-dione 3-substituted hydrazone thus obtained can be isolated from the mixture by adding more water and filtering the precipitated compound but advantageously is immediately reacted in the solution with a suitable aldehyde or ketone without isolation. The aldehydes or ketones used are usually pyruvic acid, pyruvic aldehyde and substituted benzaldehydes, such as carboxy- and hydroxybenzaldehydes. Pyruvic acid is preferred as it is water soluble and can be used in aqueous organic solvents such as dioxane-water solution, while substituted benzaldehydes are usually used in acetic acid solutions. The temperature of reaction can vary between about zero and about 100 degrees but advantageously is kept between about 25 and about seventy degrees. The reaction time depends in part on the temperature and varies at room temperature, i. e., at about twenty to thirty degrees centigrade, between eight and 36 hours, and at temperatures between fifty to seventy degrees centigrade, from one to about four hours. The product, 11α-acyloxy-17α-halo-4-pregnene-3,20-dione, is isolated from the solution by pouring the cooled solution into water and extracting with a suitable solvent, such as dichloromethane, chloroform, ether or benzene, and evaporating the solvent from the resulting extract.

The 11α-acyloxy-17α-halo-4-pregnene-3,20-dione is then admixed with a large excess of an amine which acts both as a reactant and as a solvent, and the resulting solution is heated for a suitable length of time. Any suitable amine, such as, for example, pyridine, quinoline, picoline, lutidine, collidine, methylbenzylamine, aniline, and the like can be used. Pyridine is the preferred amine. The reaction is generally conducted at the boiling point of the solution, but any temperature of about eighty to about 180 degrees centigrade is operative. The period of heating is usually dependent on the amine used, with the higher boiling amines requiring a shorter period of heating than the lower-boiling amines. Any period of about four to about 24 hours is operative, with about eight hours being preferred. If the amine used has a very high boiling point, a solvent, such as benzene, toluene, xylene, or the like, can be advantageously employed for temperature control. The thus produced 11α-acyloxy-4,16-pregnadiene is recovered from the reaction mixture by conventional means, such as extraction and recrystallization.

In order to obtain 11α-hydroxy-4,16-pregnadiene-3,20-dione, an 11α-acyloxy-4,16-pregnadiene-3,20-dione, dissolved in an aqueous organic solvent, such as aqueous methanol, aqueous ethanol, aqueous dioxane, aqueous tertiary butyl alcohol, etc. is saponified with a base, such as sodium hydroxide, potassium hydroxide, barium hydroxide, or other like base, with sodium and potassium hydroxide preferred. The mixture is usually heated under reflux for a period of about two to about twelve hours, or even longer. The excess alkali then is neutralized, suitably with a dilute mineral acid, such as hydrochloric or sulfuric acid, the organic solvent removed under reduced pressure, and the water by azeotropic distillation with benzene. The remaining oil can be purified by conventional means such as, chromatography and recrystallization from suitable solvents such as acetone, Skellysolve B (hexanes) methanol, ethanol, ethyl acetate, and mixtures thereof.

In order to obtain 4,16-pregnadiene-3,11,20-trione, 11α-hydroxy-4,16-pregnadiene-3,20-dione is oxidized. Various methods are operative such as, for example, Oppenauer oxidation with aluminum alcoholates of secondary or tertiary aliphatic alcohols and a ketone, such as acetone or cyclohexanone, oxidation with chromic acid in a heterogeneous or homogeneous medium or oxidation with a pyridine chromic acid complex. The latter method, utilizing a pyridine chromic acid complex, is preferred since the mild conditions are conducive to a better yield than obtained by any of the other reactions.

In order to carry out the oxidation of 11α-hydroxy-4,16-pregnadiene-3,20-dione, a slurry of the chromic anhydride and pyridine is prepared by stirring the chromic anhydride into excess pyridine. The chromic anhydride should be added to the pyridine rather than pyridine to chromic anhydride in order to prevent explosions which otherwise could result from momentary excess of chromic acid over pyridine. A weight ratio of ten to one hundred parts of pyridine to each part of chromic acid is operative, with ratios between thirty and sixty parts of pyridine to each part of chromic acid being preferred. To this slurry about an equal amount of pyridine solution containing 11α-hydroxy-4,16-pregnadiene-3,20-dione is added. The molar ratio of chromic acid to 11α-hydroxy-4,16-pregnadiene-3,20-dione can vary from 0.67 mole (calculated theoretical amount) to ten moles of chromic acid per mole of steroid, with ratios of two to five moles of chromic acid to each mole of steroid being preferred. The temperature of the reaction is between about zero and abouty fifty degrees centigrade with a temperature between about fifteen to about thirty degrees preferred. The reaction time varies with the temperature and in the preferred temperature range is between four to thirty-six hours. The 4,16-pregnadiene-3,11,20-trione thus produced is isolated from the reaction mixture by conventional means, such as extraction, and purified by repeated recrystallization from ethyl acetate, Skellysolve B (hexanes), and the like.

The following examples illustrate the process and product of the present invention but are not to be construed as limiting.

PREPARATION 1.—3,11α,20-TRIACETOXY-3,17(20)-PREGNADIENE

A mixture of three hundred milligrams of 11α-hydroxypregnane-3,20-dione, fifteen milliliters of acetic anhydride and 140 milligrams of para-toluenesulfonic acid monohydrate was heated to boiling and allowed to distil slowly for four hours, most of the excess acetic anhydride being distilled at the end of this time interval. The last traces of excess acetic anhydride were removed under vacuum, and the resulting residue was cooled and dissolved in ether. The ether solution was washed with cold ten percent aqueous sodium bicarbonate solution and dried over anhydrous sodium sulfate. The drying agent was removed by filtration, and the ether was distilled. The residue was dissolved in warm alcohol and allowed to crystallize. Crystalline 3,11α,20-triacetoxy-3,17(20)-pregnadiene (150 milligrams) melted at 162–167 degrees centigrade. Its structure was confirmed by infrared analysis.

In the same manner as given in Preparation 1, other 3,11α,20-triacyloxy-3,17(20)-pregnadienes are prepared by heating 11α-hydroxypregnane-3,20-dione with a selected acid anhydride including: 3,11α,20-tripropionyloxy-3,17(20)-pregnadiene, 3,11α,20-tributyroxy-3,17(20)-pregnadiene, 3,11α,20-trivaleroxy-3,17(20)-pregnadiene, 3,11α,20-triisovaleroxy-3,17(20)-pregnadiene, 3,11α,20-trihexanoyloxy-3,17(20)-pregnadiene, 3,11α,20-triheptanoyloxy-3,17(20)-pregnadiene, 3,11α,20-trioctanoyloxy-3,17(20)-pregnadiene, 3,11α,20-tribenzoyloxy-3,17(20)-pregnadiene, and the like.

PREPARATION 2.—3,20-DIACETOXY-11α-BENZOYLOXY-3,17(20)-PREGNADIENE

To 11α-hydroxypregnane-3,20-dione was added an excess of benzoyl chloride. After the solution stood for one hour at room temperature, water was added and the crystals filtered off and washed. The thus obtained 11α-benzoyloxypregnane-3,20-dione was then treated as in Preparation 1 with acetic anhydride to give 3,20-diacetoxy-11α-benzoyloxy-3,17(20)-pregnadiene.

In the same manner as shown above by treating a selected 11α-acyloxypregnane-3,20-dione with an acid anhydride, 3,20-enol esters of 11α-acyloxypregnane-3,20-diones wherein the acyloxy group on the 3- and 20-position are equal and the 11α-position has another acyloxy group are obtained. Representative 3,11α,20-triacyloxy-3,17(20)-pregnadienes include: 3,20-dipropionoxy-11α-benzoyloxy-3,17(20)-pregnadiene, 3,20-dibutyroxy-11α-benzoyloxy-3,17(20)-pregnadiene, 3,20-divaleroxy-11α-benzoyloxy-3,17(20)-pregnadiene, 3,20-dihexanoyloxy-11α-benzoyloxy-3,17(20)-pregnadiene, 3,20-dibenzoxy-11α-pentoyloxy-3,17(20)-pregnadiene, 3,20-diacetoxy-11α-propionoxy-3,17(20)-pregnadiene, 3,20-diacetoxy-11α-butyroxy-3,17(20)-pregnadiene, 3,20-diacetoxy-11α-valeroxy-3,17(20)-pregnadiene, 3,20-diacetoxy-11α-isovaleroxy-3,17(20)-pregnadiene, 3,20-diacetoxy-11α-hexanoyloxy-3,17(20)-pregnadiene, 3,20-diacetoxy-11α-heptanoyloxy-3,17(20)-pregnadiene, 3,20-diacetoxy-11α-octanoyloxy-3,17(20)-pregnadiene, 3,20-diacetoxy-11α-phenylacetoxy-3,17(20)-pregnadiene, 3,20-diacetoxy-11α-toluyloxy-3,17(20)-pregnadiene, 3,20-diacetoxy-11α-(β-cyclopentyl)-propionoxy-3,17(20)-pregnadiene, 3,20-diacetoxy-11α-trimethylacetoxy-3,17(20)-pregnadiene, 3,20-diacetoxy-11α-chloroacetoxy-3,17(20)-pregnadiene, 3,20-diacetoxy-11α-bromoacetoxy-3,17(20)-pregnadiene, 3,20-diacetoxy - 11α - dichloroacetoxy - 3,17(20) - pregnadiene, 3,20 - diacetoxy - 11α - trichloroacetoxy - 3,17(20) - pregnadiene, 3,20-diacetoxy-11α-anisyloxy-3,17(20)-pregnadiene, 3,20-diacetoxy-11α-gallyloxy-3,17(20)-pregnadiene, 3,20 - diacetoxy - 11α - mandelyloxy - 3,17(20) - pregnadiene, 3,20-diacetoxy-11α-thioglycolyloxy-3,17(20)-pregnadiene, 3,20-diacetoxy-11α-toluenesulfonyloxy-3,17(20)-pregnadiene, 3,20 - diacetoxy - 11α - benzenesulfonyloxy-3,17(20)-pregnadiene, 3,20-diacetoxy-11α-para-chlorobenzenesulfonyloxy-3,17(20)-pregnadiene, 3,20-diacetoxy-11α-(α-naphthylsulfonyloxy)-3,17(20)-pregnadiene, 3,20-diacetoxy - 11α - benzenephosphonyloxy - 3,17(20) - pregnadiene, and the like.

PREPARATION 3.—4,17α-DIBROMO-11α-ACETOXYPREGNANE-3,20-DIONE

One hundred and fifty milligrams (150 milligrams) of 3,11α,20-triacetoxy-3,17(20)-pregnadiene was dissolved in eight milliliters of tertiary butyl alcohol and treated with a solution of 128 milligrams of N-bromosuccinimide in fifteen milliliters of tertiary butyl alcohol and with five milliliters of 0.8 Normal acid. After two hours of standing the solution was concentrated, diluted with water and the resulting crystals (140 milligrams) collected. Four recrystallizations from alcohol gave white crystals of 11α-acetoxy-4,17α-dibromopregnane-3,20-dione melting at 201 to 203 degrees centigrade with decomposition.

Analysis.—Calc. for C₂₃H₃₂O₄Br: C, 51.89; H, 6.06; Br, 30.03. Found: C, 52.16; H, 5.96; Br, 30.01.

In the same manner, using 3,20-di-enol acylate of a selected 11α-acyloxy pregnadiene compound with N-bromosuccinimide, the following compounds are prepared: 4,17α-dibromo-11α-propionyloxypregnane-3,20-dione, 4,17α-dibromo-11α-butyroxypregnane-3,20-dione, 4,17α-dibromo-11α-valeroxypregnane-3,20-dione, 4,17α-dibromo-11α-isovaleroxypregnane-3,20-dione, 4,17α-dibromo-11α-hexanoyloxypregnane-3,20-dione, 4,17α-dibromo-11α-heptanoyloxypregnane-3,20-dione, 4,17α-dibromo-11α-octanoyloxypregnane-3,20-dione, 4,17α-dibromo-11α-benzoyloxypregnane-3,20-dione, 4,17α-dibromo-11α-phenylacetoxypregnane-3,20-dione, 4,17α-dibromo-11α-toluloxypregnane-3,20-dione, 4,17α-dibromo-11α-(β-cyclopentylpropionoxy)-pregnane-3,20-dione, 4,17α-dibromo-11α-trimethylacetoxypregnane-3,20-dione, 4,17α-dibromo-11α-chloroacetoxypregnane-3,20-dione, 4,17α-dibromo-11α-dichloroacetoxypregnane-3,20-dione, 4,17α-dibromo-11α-trichloroacetoxypregnane-3,20-dione, 4,17α-dibromo-11α-bromoacetoxypregnane-3,20-dione, 4,17α-dibromo-11α-anisyloxypregnane-3,20-dione, 4,17α-dibromo-11α-gallyloxypregnane-2,20-dione, 4,17α-dibromo-11α-mandelyloxypregnane-3,20-dione, 4,17α-dibromo-11α-thioglycolyloxypregnane-3,20-dione, 4,17α-dibromo-11α-toluenesulfonyloxypregnane-3,20-dione, 4,17α-dibromo-11α-benzenesulfonyloxypregnane-3,20-dione, 4,17α-dibromo-11α - para - chlorobenzenesulfonyloxypregnane - 3,20-dione, 4,17α-dibromo-11α-(α-naphthylsulfonyloxypregnane)-3,20-dione, 4,17α-dibromo-11α-benzenephosphonyloxypregnane-3,20-dione, and the like.

PREPARATION 4.—4,17α-DICHLORO-11α-ACETOXYPREGNANE-3,20-DIONE

Following the procedure as given in Preparation 3, but using hypochlorous acid, or mineral acid with a hypochlorite, such as sodium or calcium hypochlorite, N-chlorosuccinimide or N-chloroacetamide with dilute sulfuric acid instead of the N-bromosuccinimide to treat a solution of 3,11α,20-triacetoxy-3,17(20)-pregnadiene dissolved in tertiary butyl alcohol, results in 4,17α-dichloro-11α-acetoxypregnane-3,20-dione.

In the same manner, using 3,20-di-enol acylates of the selected 11α-acyloxypregnane compound and hypochlorous acid or an N-chloroacylamide, the following compounds are prepared: 4,17α-dichloro-11α-propionoxypregnane-3,20-dione, 4,17α-dichloro-11α-butylroxypregnane-3,20-dione, 4,17α-dichloro-11α-valeroxypregnane-3,20-dione, 4,17α-dichloro-11α-isovaleroxypregnane-3,20-dione, 4,17α-dichloro-11α-hexanoyloxypregnane-3,20-dione, 4,17α-dichloro-11α-heptanoyloxypregnane-3,20-dione, 4,17α-dichloro-11α-octanoyloxypregnane-3,20-dione, 4,17α - dichloro - 11α - benzoyloxypregnane - 3,20 - dione, 4,17α - dichloro - 11α - phenylactoxypregnane - 3,20 - dione, 4,17α-dichloro-11α-toluyloxypregnane-3,20-dione, 4,17α - dichloro - 11α - (β - cyclopentylpropionoxy) - pregnane-3,20-dione, 4,17α-dichloro-11α-trimethylacetoxypregnane-3,20-dione, 4,17α-dichloro-11α-chloroacetoxypregnane-3,20-dione, 4,17α-dichloro-11α-bromoacetoxypregnane-3,20-dione, 4,17α-dichloro-11α-dichloroacetoxypregnane-3,20-dione, 4,17α-dichloro-11α-trichloroacetoxypregnane-3,20-dione, 4,17α-dichloro-11α-anisyloxypregnane-3,20-dione, 4,17α-dichloro-11α-gallyloxypregnane-3,20-dione, 4,17α-dichloro-11α-mandelyloxypregnane-3,20-dione, 4,17α-dichloro-11α-thioglycolyloxypregnane-3,20-dione, 4,17α-dichloro-11α-toluenesulfonyloxypregnane-3,20-dione, 4,17α-dichloro-11α-benzenesulfonyloxypregnane-3,20-dione, 4,17α-dichloro-11α-chlorobenzenesulfonyloxypregnane-3,20-dione, 4,17α-dichloro-11α-(α-naphthylsulfonyloxy)-pregnane-3,20-dione, 4,17α-dichloro-11α-benzenephosphonyloxypregnane-3,20-dione, and the like.

Example 1.—11α - acetoxy - 17α - bromo - 4 - pregnene-3,20 - dione

A solution of 532 milligrams (one millimole) of 4,17α-dibromo - 11α - acetoxypregnane - 3,20 - dione, dissolved in 100 milliliters of dioxane, was admixed with 2.5 milliliters of an aqueous solution containing 223 milligrams (two millimoles) of semicarbazide and 164 milligrams (two millimoles) of sodium acetate (anhydrous). The color of the reaction mixture changed slowly from very light yellow to orange and gradually back to a pale yellow color. The mixture was stirred overnight at room temperature and thereafter a solution consisting of 0.52 milliliter of pyruvic acid in five milliliters of water was added. The reaction mixture was then heated to about seventy degrees centigrade for a period of three hours, thereafter cooled and poured into 200 milliliters of water. The thus-produced 11α-acetoxy-17α-bromo-4-pregnene-3,20-dione was extracted from the aqueous mixture with three 75-milliliter portions of methylene dichloride. The extracts were washed with two fifty-milliliter portions of one percent aqueous sodium hydroxide solution, then with water until the wash-water was neutral, and then dried over anyhdrous sodium sulfate and concentrated to yield 0.452 gram of an oil. This oil containing 11α - acetoxy - 17α - bromo - 4 - pregnene-3,20-dione was purified by chromatography and recrystallization from acetone and Skellysolve B (hexanes) yielding 162 milligrams of 11α acetoxy-17α-bromo-4-pregnene-3,20-dione of melting point 166 to 168 degrees centigrade.

Analysis.—Calculated for C₂₃H₃₁BrO₄: Br, 17.70. Found: Br, 17.65.

Following the procedure of Example 1, using any of the various preparations under Preparations 3 and 4, there are obtained the following 11α-acyloxy-17α-halo-4 - pregnene - 3,20 - diones: 11α - propionoxy - 17α-chloro- or bromo-4-pregnene-3,20-dione, 11α-butyroxy-17α - chloro- or bromo - 4 - pregnene - 3,20 - dione, 11α-valeroxy - 17α - chloro- or bromo - 4 - pregnene - 3,20-dione, 11α-isovaleroxy-17α-chloro- or bromo-4-pregnene-3,20 - dione, 11α - hexanoyloxy - 17α - chloro- or bromo-4 - pregnene - 3,20 - dione, 11α - heptanoyloxy - 17α-chloro- or bromo - 4 - pregnene - 3,20 - dione, 11α - octanoyloxy - 17α - chloro- or bromo - 4 - pregnene - 3,20-dione, 11α - benzoxyl - 17α - chloro- or bromo - 4 - pregnene - 3,20 - dione, 11α - phenylacetoxy - 17α - chloro-or bromo - 4 - pregnene - 3,20 - dione, 11α - toluyloxy-17α - chloro- or bromo - 4 - pregnene - 3,20 - dione, 11α - (β - cyclopentylpropionoxy) - 17α - chloro- or bromo - 4 - pregnene - 3,20 - dione, 11α - trimethylacetoxy - 17α - chloro- or bromo - 4 - pregnene - 3,20-dione, 11α - chloroacetoxy - 17α - chloro- or bromo - 4-pregnene - 3,20 - dione, 11α - dichloroacetoxy - 17α-chloro- or bromo - 4 - pregnene - 3,20 - dione, 11α - trichloroacetoxy - 17α - chloro- or bromo - 4 - pregnene-3,20 - dione, 11α - bromoacetoxy - 17α - chloro- or bromo - 4 - pregnene - 3,20 - dione, 11α - anisyloxy-17α - chloro- or bromo - 4 - pregnene - 3,20 - dione, 11α - gallyloxy - 17α - chloro- or bromo - 4 - pregnene-3,20 - dione, 11α - mandelyloxy - 17α - chloro- or bromo-4 - pregnene - 3,20 - dione, 11α - thioglycolyloxy - 17α-chloro- or bromo - 4 - pregnene - 3,20 - dione, 11α - toluenesulfonyloxy - 17α - chloro- or bromo - 4 - pregnene-3,20 - dione, 11α - benzenesulfonyloxy - 17α - chloro- or bromo - 4 - pregnene - 3,20 - dione, 11α - chlorobenzenesulfonyloxy - 17α - chloro- or bromo - 4 - pregnene-3,20 - dione, 11α - (α - naphthylsulfonyloxy) - 17α-chloro- or bromo - 4 - pregnene - 3,20 - dione, 11α - benzenephosphonyloxy - 17α - chloro- or bromo - 4 - pregnene - 3,20 - dione, and the like.

*Example 2.—11α-acetoxy-4,16-pregnadiene-3,20-dione*

One gram of 11α - acetoxy - 17α - bromo - 4 - pregnene-3,20-dione was dissolved in 25 milliliters of dry pyridine and heated under reflux during a period of 24 hours. Thereafter, most of the pyridine was removed by distillation under reduced pressure. The residue was then dissolved in fifty milliliters of benzene. Fifty milliliters of water were added to the benzene solution, the layers were separated and the benzene solution was washed with one Normal hydrochloric acid until all pyridine was removed. Thereafter the benzene solution was washed with water until neutral, dried over anhydrous magnesium sulfate and concentrated to dryness under reduced pressure. The residual oil crystallized spontaneously. The thus obtained crystals of 11α-acetoxy - 4,16 - pregnadiene - 3,20 - dione were recrystallized from a solution consisting of two milliliters of ethylacetate and twenty milliliters of Skellysolve B (hexanes) yielding 708 milligrams (86.3 percent) of 11α-acetoxy-4,16-pregnadiene-3,20-dione in the form of needles. A second recrystallization from 2.5 milliliters of isopropyl alcohol yielded 622 milligrams (75.7 percent) of 11α-acetoxy-4,16-pregnadiene-3,20-dione of melting point 176 to 178 degrees centigrade.

*Example 3.—11α - hydroxy - 4,16 - pregnadiene - 3,20-dione*

A mixture of 740 milligrams (two millimoles) of 11α-acetoxy-4,16-pregnadiene-3,20-dione, 168 milligrams of potassium hydroxide, seven milliliters of water and twenty milliliters of purified dioxane were heated under reflux for a period of seven hours. The excess alkali was then neutralized with one tenth Normal hydrochloric acid, and some silica which separated, was removed by filtration. The volatile solvents were removed by distillation under reduced pressure and the last traces of water by azeotropic distillation with benzene. The remainder, an oil which could not be induced to crystallize was chromatographed over 65 grams of Florisil (anhydrous magnesium silicate). Practically all the material was recovered with a solution containing one part of acetone and nine parts of Skellysolve B. The like fractions were combined, concentrated, and the residue recrystallized from a solution consisting of fifteen milliliters of ethyl acetate and twenty milliliters of Skellysolve B (hexanes) yielding 447 milligrams (68 percent) of 11α - hydroxy - 4,16 - pregnadiene - 3,20 - dione of melting point 179 to 180 degrees centigrade.

*Analysis.*—Calculated for C₂₁H₂₈O₃: C, 76.79; H, 8.59. Found: C, 76.92; H, 8.39.

*Example 4.—11α - benzoyloxy - 17α - bromo - 4 - pregnene-3,20-dione*

A solution of 4,17α - dibromo - 11α - benzoyloxypregnane-3,20-dione dissolved in acetic acid was admixed with a solution of 2,4-dinitrophenylhydrazine hydrochloride and sodium acetate in acetic acid. After stirring for eighteen hours at room temperature the mixture was poured into water and the 3-(2,4-dinitrophenylhydrazone) of 11α - benzoyloxy - 17α - bromo - 4 - pregnene-3,20-dione was obtained by extraction with methylene dichloride. The thus-obtained 2,4-dinitrophenylhydrazone was then heated with parahydroxybenzaldehyde in acetic acid solution to give 11α-benzoyloxy-17α-bromo-4-pregnene-3,20-dione.

In the same manner as in the above example but using 3,5-dinitrophenylhydrazone, phenylhydrazine, para-nitrophenylhydrazine, semicarbazine, or α- or β-naphthylsemicarbazide instead of 2,4-dinitrophenylhydrazine and pyruvic acid, pyruvic aldehyde or carboxybenzaldehydes instead of para-hydroxybenzaldehyde to treat 11α-benzoyloxy-4,17α-dibromopregnane-3,20-dione, 11α-benzoyloxy-17α-bromo-4-pregnene-3,20-dione is obtained. Also using other 11α-acyloxy-4,17α-dibromo- or dichloropregnane-3,20-diones other 11α-acyloxy-17α-bromo- or chloro-4-pregnene-3,20-diones, such as listed under Preparations 3 and 4, can be obtained.

*Example 5.—11α-benzoyloxy-4,16-pregnadiene-3,20-dione*

A solution of 11α-benzoyloxy-17α-bromo-4-pregnene-3,20-dione in collidine was kept during a period of 24 hours at a temperature between about 110 and 120 degrees centigrade. Thereafter the reaction mixture was diluted with ether and washed repeatedly with one Normal hydrochloric acid to remove the collidine. The excess acid was removed from the ether solution by washing with a sodium carbonate solution and finally water. The ether solution was then dried over anhydrous sodium sulfate and evaporated. The thus obtained residue was chromatographed as described in Example 2 to yield 11α-benzoyloxy-4,16-pregnadiene-3,20-dione.

*Example 6.—11α-hydroxy-4,16-pregnadiene-3,20-dione*

In a manner as given in Example 3, 11α-benzoyloxy-4,16-pregnadiene-3,20-dione is hydrolyzed with potassium hydroxide in aqueous dioxane to give 11α-hydroxy-4,16-pregnadiene-3,20-dione.

Following the procedures of Examples 2 and 5, other 11α-acyloxy-17α-halo - 4 - pregnene - 3,20 - diones can be heated with pyridine, collidine, lutidine, picolines, or other bases to produce additional 11α-acyloxy-4,16-pregnadiene-3,20-diones such as: 11α-propionyloxy-4,16-pregnadiene-3,20-dione, 11α-butyroxy-4,16-pregnadiene-3,20-dione, 11α-valeroxy-4,16-pregnadiene - 3,20 - dione, 11α-hexanoyloxy-4,16-pregnadiene-3,20-dione, 11α-heptanoyloxy-4,16-pregnadiene-3,20-dione, 11α-octanoyloxy-4-16 - pregnadiene - 3,20 - dione, 11α-phenylacetoxy-4,16-pregnadiene-3,20-dione, 11α-toluyloxy-4,16-pregnadiene-3,20-dione, 11α-trimethylacetoxy-4,16-pregnadiene-3,20-dione, 11α-chloroacetoxy-4,16-pregnadiene - 3,20 - dione, 11α - bromoacetoxy - 4,16 - pregnadiene-3,20-dione, 11α-dichloroacetoxy-4,16 - pregnadiene - 3,20 - dione, 11α-trichloroacetoxy-4,16-pregnadiene-3,20-dione, 11α - anisyloxy-4,16 - pregnadiene - 3,20 - dione, 11α-gallyloxy-4,16-pregnadiene-3,20-dione, 11α-mandelyloxy - 4,16 - pregnadiene-3,20-dione, 11α-thioglycolyloxy-4,16 - pregnadiene-3,20-dione, 11α-toluenesulfonyloxy - 4,16 - pregnadiene-3,20-dione, 11α-benzenesulfonyloxy - 4,16 - pregnadiene-3,20-dione, 11α-chlorobenzenesulfonyloxy - 4,16 - pregnadiene-3,20-dione, 11α - (α - naphthylsulfonyloxy) - 4,16-pregnadiene-3,20-dione, 11α-benzenephosphonyloxy-4,16-pregnadiene-3,20-dione, and the like; and following the procedures of Examples 3 and 6, the thus obtained 11α-acyloxy-4,16-pregnadiene-3,20-diones upon heating with sodium or potassium hydroxide in aqueous dioxane, methanol, ethanol or tertiary butyl alcohol yield 11α-hydroxy-4,16-pregnadiene-3,20-dione.

Example 7.—4,16-pregnadiene-3,11,20-trione

A slurry of chromic anhydride and pyridine was prepared by adding slowly under stirring 250 milligrams of chromic anhydride to cold pyridine, about fifteen degrees centigrade. As already mentioned before, the chromic anhydride must be added to the pyridine and not pyridine to the chromic anhydride in order to prevent an explosion. To this slurry was then added a solution of 250 milligrams of 11α-hydroxy-4,16-pregnadiene-3,20-dione in ten milliliters of pyridine. The mixture was swirled several times and allowed to stand overnight at room temperature, at about twenty to twenty-five degrees centigrade. Finely-divided, dark-red solid separated during this period which was collected on a filter and washed with pyridine. The wash-liquid was combined with the filtrate and evaporated to a small volume at 25 degrees centigrade under reduced pressure. To this solution were added 25 milliliters of benzene and thereafter the solution was washed with one Normal hydrochloric acid until the wash liquid was acidic. An emulsion resulted in the last washing and therefore both phases were filtered through a celite (diatomaceous earth) pad, which was then washed with benzene. The clarified phases were then separated and the benzene layer was washed with water until neutral, dried over anhydrous magnesium sulfate, and concentrated under reduced pressure to an oil. This residual oil crystallized spontaneously, and the resulting crystals were recrystallized from ethyl acetate-Skellysolve B (hexanes) solution. The needles thus obtained weighed 151 milligrams, a yield of 60.4 percent. After a further recrystallization from an ethyl acetate-Skellysolve B solution thus produced 4,16-pregnadiene-3,11,20-trione melted at 202 to 204 degrees centigrade. The infrared spectrum agrees with that expected for 4,16-pregnadiene-3,11,20-trione.

Example 8.—4,16-pregnadiene-3,11,20-trione

11α-hydroxy-4,16-pregnadiene-3,20-dione, dissolved in benzene, was agitated with a solution of sodium dichromate in aqueous sulfuric acid, at a temperature of about fifteen degrees during a period of six hours. The benzene layer was separated from the aqueous dichromate layer, washed with sodium carbonate and then water until neutral, dried over anhydrous magnesium sulfate and evaporated to an oil. This material was crystallized from ethyl acetate and Skellysolve B (hexanes) to give 4,16-pregnadiene-3,11,20-trione.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. 4,16-pregnadiene-3,11,20-trione.
2. A process for the production of 4,16-pregnadiene-3,11,20-trione which comprises: forming the 3-hydrazone of 11α-acyloxy-17α-halo-4-pregnene-3,20-dione by reacting an organic hydrazine with a 4,17α-dihalo-11α-acyloxypregnane-3,20-dione, wherein the acyloxy group contains from one to eight carbon atoms, inclusive, hydrolyzing the thus produced 3-hydrazone to the corresponding 11α-acyloxy - 17α - halo-4-pregnene-3,20-dione, dehydrohalogenating the thus obtained 11α-acyloxy-17α-halo-4-pregnene-3,20-dione to the corresponding 11α-acyloxy-4,16-pregnadiene-3,20-dione, hydrolyzing the thus obtained 11α-ester to 11α-hydroxy-4,16-pregnadiene-3,20-dione, and oxidizing the 11α-hydroxy-4,16-pregnadiene-3,20-dione to 4,16-pregnadiene-3,11,20-trione.
3. A process for the production of 4,16-pregnadiene-3,11,20-trione which comprises: forming the 3-hydrazone of 11α-acyloxy-17α-halo-4-pregnene - 3,20-dione by reacting an organic hydrazine with a 4,17α-dihalo-11α-acyloxypregnane-3,20-dione, wherein the acyloxy group contains from one to eight carbon atoms, inclusive, hydrolyzing the thus produced 3-hydrazone by an exchange reaction with a ketaldone selected from the group of pyruvic acid, pyruvic aldehyde and benzaldehydes to the corresponding 11α-acyloxy-17α-halo - 4-pregnene-3,20-dione, dehydrohalogenating the thus obtained 11α-acyloxy-17α-halo-4-pregnene-3,20-dione by heating with an amine to the corresponding 11α-acyloxy-4,16-pregnadiene-3,20-dione, hydrolyzing the thus obtained 11α-ester with an alkali-metal hydroxide base to 11α-hydroxy-4,16-pregnadiene-3,20-dione and oxidizing the 11α-hydroxy-4,16 pregnadiene-3,20-dione with a pyridine-chromic anhydride complex to 4,16-pregnadiene-3,11,20-trione.
4. A process for the production of 4,16-pregnadiene-3,11,20-trione which comprises: reacting semicarbazide and a 4,17 - dichloro - 11α-acyloxypregnane-3,20-dione, wherein the acyloxy group contains from one to eight carbon atoms, inclusive, treating the thus obtained 3-semicarbazone of 11α-acyloxy-17α-chloro - 4 - pregnene-3,20-dione with pyruvic acid to obtain the corresponding 11α-acyloxy-17α-chloro - 4 - pregnene-3,20-dione, heating the thus obtained 11α-acyloxy-17α-chloro-4-pregnene-3,20-dione with pyridine to obtain the corresponding 11α-acyloxy-4,16-pregnadiene-3,20-dione, hydrolyzing the thus obtained 11α-ester with an alkali metal hydroxide base to 11α-hydroxy-4,16-pregnadiene-3,20-dione, and oxidizing the 11α-hydroxy-4,16-pregnadiene-3,20-dione with a pyridine-chromic anhydride complex to 4,16-pregnadiene-3,11,20-trione.
5. A process for the production of 4,16-pregnadiene-3,11,20-trione which comprises: reacting semicarbazide and a 4,17 - dibromo-11α-acyloxypregnane-3,20 - dione, wherein the acyloxy group contains from one to eight carbon atoms, inclusive, treating the thus obtained 3-semicarbazone of 11α-acyloxy - 17α - bromo-4-pregnene-3,20-dione with pyruvic acid to obtain the corresponding 11α-acyloxy-17α-bromo-4-pregnene - 3,20 - dione, heating the thus obtained 11α-acyloxy-17α-bromo-4-pregnene-3,20-dione with pyridine to obtain the corresponding 11α-acyloxy-4,16-pregnadiene-3,20-dione, hydrolyzing the thus obtained 11α-ester with an alkali metal hydroxide base to 11α-hydroxy - 4,16 - pregnadiene-3,20-dione, and oxidizing the 11α-hydroxy-4,16-pregnadiene-3,20-dione with a pyridine-chromic anhydride complex to 4,16-pregnadiene-3,11,20-trione.
6. The process of claim 5 wherein the 4,17-dibromo-11α-acyloxypregnane - 3,20 - dione is 4,17-dibromo-11α-acetoxypregnane-3,20-dione.

No references cited.